(12) United States Patent
Kusyk

(10) Patent No.: US 6,246,668 B1
(45) Date of Patent: Jun. 12, 2001

(54) HITLESS MANUAL PATH SWITCHING USING LINKED POINTER PROCESSORS

(75) Inventor: Richard Glenn Kusyk, Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/093,398

(22) Filed: Jun. 9, 1998

(51) Int. Cl.[7] .................................................. H04B 17/00
(52) U.S. Cl. ............................................ 370/228; 370/248
(58) Field of Search ........................... 359/110; 370/225, 370/228, 248

(56) References Cited

U.S. PATENT DOCUMENTS

| | | | |
|---|---|---|---|
| 5,974,027 | * 10/1999 | Chapman | 370/228 |
| 6,061,329 | * 5/2000 | Abe | 370/228 |
| 6,078,596 | * 6/2000 | Wellbrock | 370/907 |

FOREIGN PATENT DOCUMENTS

| | | | |
|---|---|---|---|
| 3-201840 | 9/1991 | (JP) | H04L/1/22 |
| 8-79214 | 3/1996 | (JP) | H04J/3/14 |
| 8-223130 | 8/1996 | (JP) | H04J/3/14 |
| 9-36826 | 2/1997 | (JP) | H04J/3/14 |
| 10-135923 | 5/1998 | (JP) | H04J/3/14 |

OTHER PUBLICATIONS

K. Nishihata, et al., "SDH 52/156 Mb/s (VC–3/4) Digital Cross–Connect Systems with Hit–Less Switching Function", NTT Review, vol. 5, No. 5, Sep. 1993, pp. 64–71.

Y. Sato et al., "Economical and Reliable SDH Optical Transmission System", NTT Review, vol. 7, No. 6, Nov. 1995, pp. 80–84.

* cited by examiner

Primary Examiner—Melvin Marcelo
(74) Attorney, Agent, or Firm—Aprilia U. Diaconescu

(57) ABSTRACT

A method and apparatus for hitless path switching whereby synchronous traffic is re-directed from an alternate path back over a primary path. A trace message is inserted at an originating path terminal into an information signal and the information signal is transmitted along the primary path and the alternate path. The information signal experiences different delays along the primary and alternate paths. The receiving path terminal is provided with two pointer processors, one for the primary path and one for the alternate path. The pointer processors use a first and a second buffer, respectively, for storing a number of frames of the respective information signal. The information signals arrive at the selector phase aligned, after the pointer processors perform positive and negative stuffing, respectively. Alignment is determined by the relationship $0 \leq (W_{int} + W_{ext}) - 2R - M \leq 1$, where were M is the size of the buffers, R is the read address, $W_{int}$ is the current write address in the first buffer, and $W_{ext}$ is the write address in the second buffer.

17 Claims, 6 Drawing Sheets

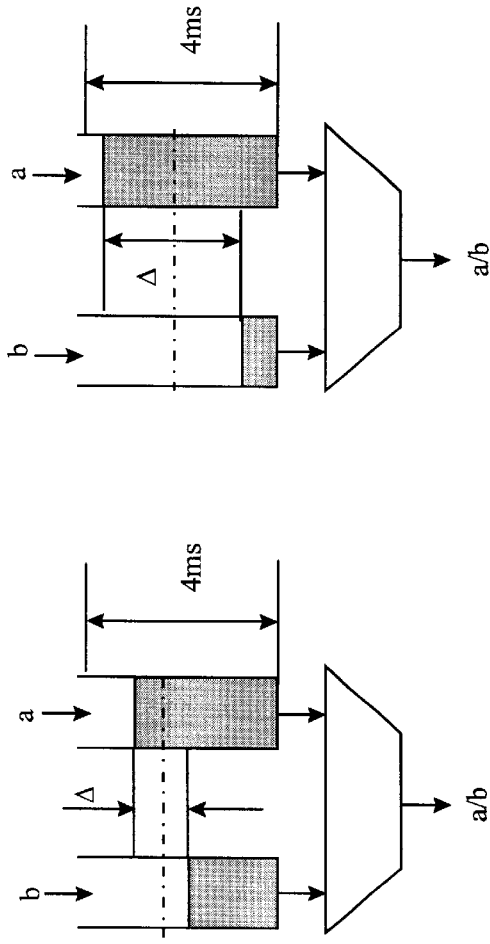
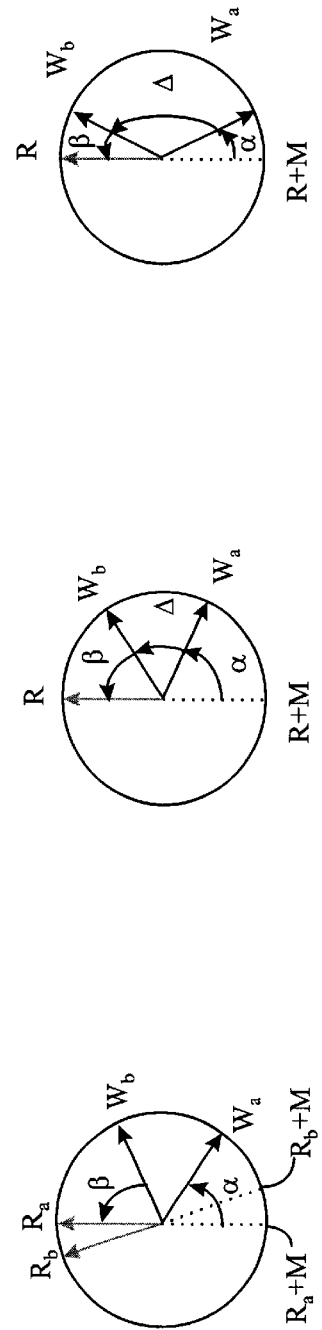
FIGURE 6A
FIGURE 6B
FIGURE 7A
FIGURE 7B
FIGURE 7C

HITLESS MANUAL PATH SWITCHING USING LINKED POINTER PROCESSORS

FIELD OF THE INVENTION

This invention is directed to a hitless manual path switching method and apparatus, and more particularly, to a method and apparatus for hitless manual path switching using linked pointer processors.

BACKGROUND ART

Hitless (error-free) switching is required mainly in the case of fiber-maintenance/construction. When telecommunication cables are relocated in an existing digital network, the information that was transported on these cables must be redirected on an alternative path to avoid interruption of services. In such cases, the network operator must redirect manually the traffic on the affected path over an alternative path, that most probably has a different length and a different number of network elements (NEs).

In case of protected networks, it is possible to use the protection fiber to accommodate the traffic affected by the relocation/maintenance operation.

However, in general, hitless manual switching operation requires reconfiguring the network for locating an alternative path to accommodate the disrupted traffic, which is not an easy task.

As there is a difference in the length of the permanent and alternative paths and in the number of NEs in each of these paths, the signals travelling along these two paths generally experience a differential delay, which must be aligned at the receiver site in order to obtain hitless switching.

There is a need to achieve cross-connection of the paths without disrupting the services, whereby eliminating the need for network operations associated with switching traffic from one path to another.

There is also a need to provide a communication network with hitless switching capabilities for traffic at small physical granularity, for flexibility and cost purposes.

SUMMARY OF THE INVENTION

It is an object of the present invention to provide a communication system with a method and apparatus for hitless switching between a cable-to-be-relocated and a cable for normal operation.

It is another object of the invention to provide a method and apparatus for implementing hitless switching at the path level in a synchronous communication system operating according to the SDH/SONET standard.

Therefore in accordance with a first aspect of the present invention there is provided a hitless path switching method for re-establishing synchronous traffic along a primary path from an alternate path, comprising the steps of at an originating path terminal, generating a trace message, inserting the trace message in an information signal and transmitting the information signal along the primary path as a first information signal and along the alternate path as a second information signal, at a receiving path terminal, recovering a first variant of the trace message from the first information signal and recovering a second variant of the trace message from the second information signal, each the first and second variants being a respective delayed variant of the trace message; aligning the first and the second information signals based on the phase difference between the first and the second variants generating a signal when alignment is completed, and at the originating path terminal, discontinuing transmission of the information signal along the alternate path upon generation of the signal.

In accordance with a second aspect of the present invention there is provided a hitless path switching apparatus for re-establishing synchronous traffic along a primary path from an alternate path, comprising, a first align block for receiving an information signal over a primary path and providing a first outgoing information signal of a controlled phase difference with the information signal, a link for providing to the first align block, time information from a second align block, and a first buffer for storing a first variant of a received trace message extracted from a known timeslot of L successive frames of the information signal.

Advantageously, the method and apparatus according to the present invention provide a delay adjustment function which equalizes the phases of the signal travelling along the cable-to-be-relocated and the cable for the normal operation, so that the path switching occurs with practically no errors.

The method and apparatus according to the present invention advantageously use linked point processors, which eliminate the need for a master-slave relationship. A master-slave relationship is generally more difficult to control.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 6A and 6B show the delay adjustment for hitless switching;

FIGS. 7A to 7C illustrate the operation of the pointer processors; and

DESCRIPTION OF THE PREFERRED EMBODIMENT

Figure 1:
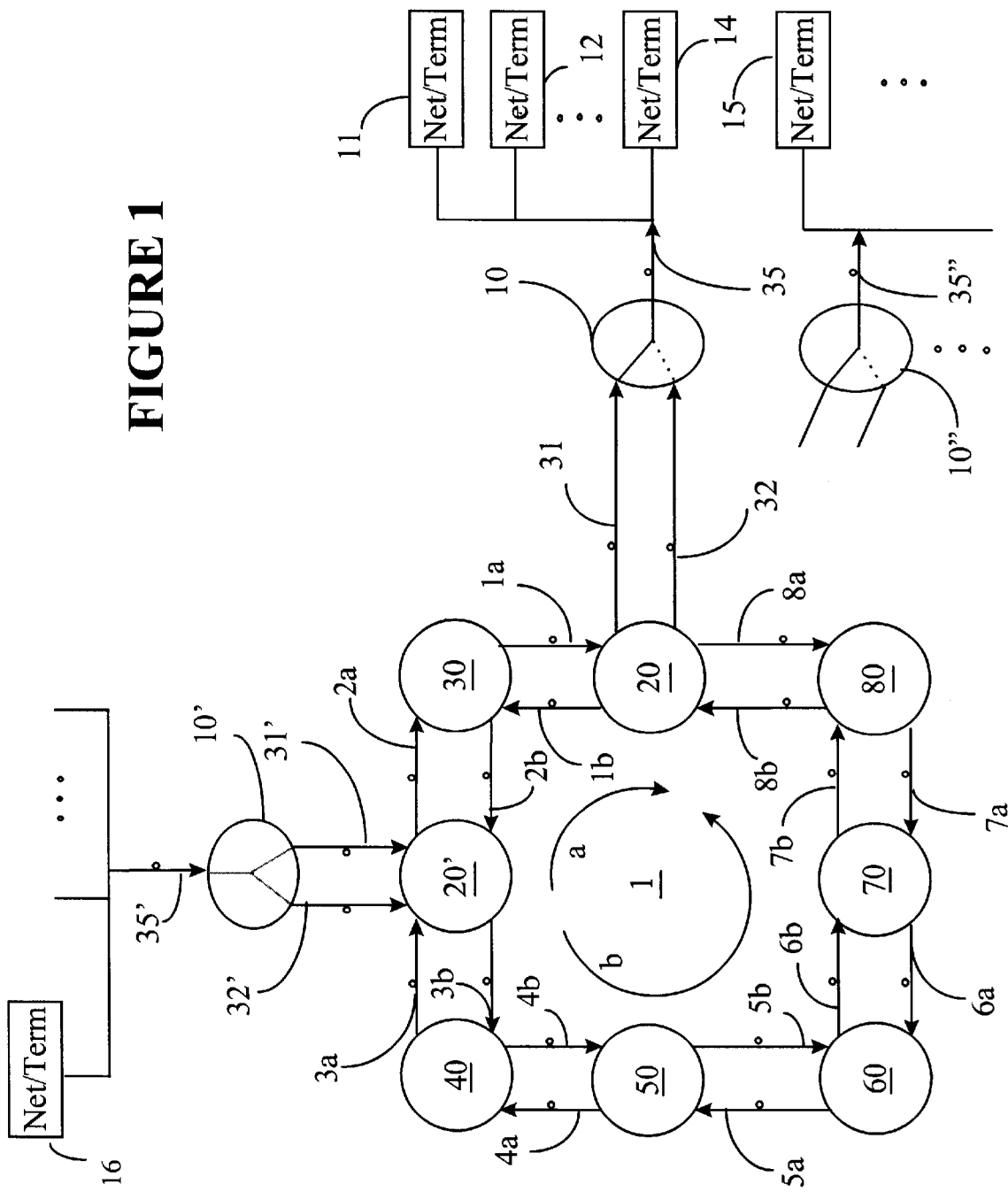
FIG. 1 is an example of a network for showing the network elements and the cables involved in the hitless switching operation.

Definition of some terms is provided next for a better understanding of the invention.

The synchronous optical network (SONET) is an integrated network standard for optical transmission, from which all vendors can built their equipment to interface with each-other at mid-span. SONET is based on synchronous digital hierarchy (SDH) using notably improved operation, administration, maintenance, and provisioning (OAM&P) features. SDH/SONET also provides the ability to combine and consolidate traffic from different locations through one facility (grooming).

The physical layer of SDH/SONET is modelled on three major entities: transmission path, multiplex section and regenerator section, each entity requiring the services of all lower layers to perform its own functions. These layers correspond to SONET path, line and section layers.

The basic SDH signal is called synchronous transport module (STM) and its rate is 155.52 Mbit/s. The basic SONET signal is called synchronous transport signal level 1 (STS-1) and its rate is 51.840 Mbit/s, which corresponds to an 125 microseconds frame, comprised of 8-bit octets. The frame of these synchronous signals includes a transport overhead (TOH) with octets allocated for section and line information, and a payload comprising octets allocated for path information and user information. The payload is carried in a virtual container (VC) for STMs, or in a synchronous payload envelope (SPE) for STSs.

SDH/SONET add/drop multiplexer (ADM) multiplexes various STM/STS-formatted input streams onto optical fiber channels. Lower speed signals are multiplexed together to form a STS-N signal, where N could be 1, 3, 6, 12, 24, 48, or 192. The STS/STM signals are carried over optical fibers by an optical carrier, which is defined according to the STS that it carries. Thus, an STS-192 signal is carried by an OC-192 optical carrier. Similarly, a STM-1, which is equivalent with an STS-3, can be multiplexed to obtain signals of higher rates, such as STM-64, which is equivalent with an STS-192.

The path layer deals with the transport of services, such as DS1 or DS3, between path terminating equipment (PTE). The PTE could be ADMs or terminals serving routers, bridges, PBXs or switches. The main function of the path layer is to map the services and path overhead (POH) into STS-1s, which is the SONET format required by the line layer.

The TOH is comprised of fields used for carrying line and section information. Of relevance to this invention are bytes H1–H2, called the payload pointer, which provides a method for flexible and dynamic alignment of the STS-SPE with respect to the STS-1 frame. This dynamic alignment means that the STS-1 SPE can float within the STS- frame, i.e. the STS-1 SPE can begin anywhere in the STS envelope capacity, it may start in one frame and end in the next. The pointer value is the offset (number of bytes) between the payload pointer and the first byte of the STS SPE.

When there is a difference in phase or frequency, the pointer value is adjusted up or down accordingly. A process known a byte stuffing is used to accomplish this adjustment. When the frame rate of the STS SPE is too slow with respect to the rate of the STS-1, a stuff byte is added (positive stuff). The pointer is incremented by one in the next frame; so that if the original pointer had a value of p, the new pointer is p+1. The positive stuff byte appears immediately after the H3 byte in the frame. Subsequent pointers contain the new offset.

When the frame rate of the SPE is too fast in relation to the rate of the STS-1 rate, actual data is written in byte H3 of the line OH (negative stuff). The pointer is decremented by one in the next frame, so that if the pointer had a value of p, the new pointer is p−1. Negative stuffing (actual data) appears in the H3 byte in the frame. Subsequent pointers contain the new offset.

The path overhead for each STS-1 is carried in the STS-N SPE. Of relevance to this invention is the byte J1, the trace byte, used to identify that the correct connection was made between the end points of the path. This byte is generally used to repetitively transmit a 64 byte, fixed length string so that a receiving terminal in a path can verify its continued connection to the intended transmitter. The message content is not constrained by the SONET/SDH standard, since it is user-programmable at both the transmit and receive ends.

The hitless switching according to the present invention is described herein in connection with transporting a lower rate STM-N traffic between two terminals or networks along routes involving OC-192 network nodes and OC-12 trib equipment. It is to be understood that these rates are given by way of example only, the invention may be applied to other rates.

Physical granularity of traffic provided with hitless switching shall be small enough for flexibility and cost effectiveness. The option can be added/removed on a per-path basis, and preferably for rates of maximum STS-12. In the following, the term 'normal connection' is used for indicating that the hitless switching is disabled for the respective path, while the term 'hitless connection' is used for indicating that the hitless switching is enabled.

FIG. 1 is an example of a network for showing the network elements and the cables involved in the hitless switching operation. The arrows on FIG. 1 relate to the traffic that is relevant to the following description of the invention, namely to traffic from network/terminal 16 to network/terminal 11. It is to be understood that the traffic is in fact bidirectional on cables 31, 32, 31', 32', 35, 35' and undirectional on cables marked with a and b on virtual ring 1.

Under normal conditions of operation, the traffic between terminal/network 16 and terminal/network 11 is directed along a path comprising cable 35', trib equipment 10', cable 31', network element (NE) 20', cable 2a, NE 30, cable 1a, NE 20, cable 31, trib equipment 10 and cable 35. The path between equipment 10' and 10 is denoted using letter a and the direction of traffic along this path is shown by arrow a.

If path a becomes unavailable during a maintenance/construction activity involving cables 1a and 1b, the traffic between NE 20' and 20 must be redirected along an alternative path, comprising cable 3b, NE 40, cable 4b, NE 50, cable 5b, NE 60, cable 6b, NE 70, cable 7b, NE 80, and cable 8b. This alternative path between equipment 10' and 10 is denoted using letter b and the direction of transmission along this path is opposite to the direction on path a, as shown by arrow b. Maintenance/constructions may then proceed on the affected cables of path a without affecting the traffic on path b.

NEs 20, 30, 20', 40, 50, 60, 70, and 80 form a virtual ring 1 with NEs working, in this example, at 10 Gbit/s, corresponding to a SONET OC-192. NE 20 and 20' groom the traffic between the virtual ring 1 and the lower speed tributary equipment shown at 10 and 10', providing the add/drop multiplex and transmitter/receiver functions. A block 11–16 shows, in the example of FIG. 1, a terminal or a network that operates at STM-0, STM-1, or STM-4 rate, providing STM-0/STM-1/STM-4 termination. The number of terminals 11–16 depends on the granularity of the traffic that they process. Thus, one terminal 10 is needed to process signals at STM-4 granularity, four terminals 10 for STM-1 granularity, and twelve terminals 10 for STM-0 granularity.

When the maintenance/construction activity on path a finishes, the traffic may be switched back from path b to path a. Hitless switching implies that the network operator effects a manual path switch between the alternative paths b to normal operation path a, and the switching occurs with practically no errors.

It can be seen on FIG. 1 that the traffic travels a longer distance on path b to reach node 20 than on path a. In addition, the signals pass through a different number of NEs on each path. Therefore, the traffic on path a and path b arrive at the destination node 20 with a phase difference, which depends on the linear difference between the length of the cables along the two paths, and also on the pass delay through all respective network elements.

According to the invention, the delay between the two path is compensated for in real time at the path terminating equipment using a path trace message inserted at the transmitter site in the signal to-be-switched. In the example considered above, terminal 10' insets in the information signal a trace path message for terminal 10 on both path a and path b. At trib equipment 10, the phase difference (delay $\Delta$) between trace messages received from the short and long paths is used to align the long and short paths traffic. Namely, the traffic received on short path is delayed so as to arrive at the selector of the destination trib equipment simultaneously with the traffic received on the long path. Only then hitless switching may occur and the traffic on alternative path may be discontinued.

Before any alignment, the received trace message is compared with an expected value to determine if the correct connection was made between the end points of the path (STS-12 path between terminals 10' and 10 in this example). If these are not identical, hitless switching is not performed.

Figures 2A, 2B, 2C:
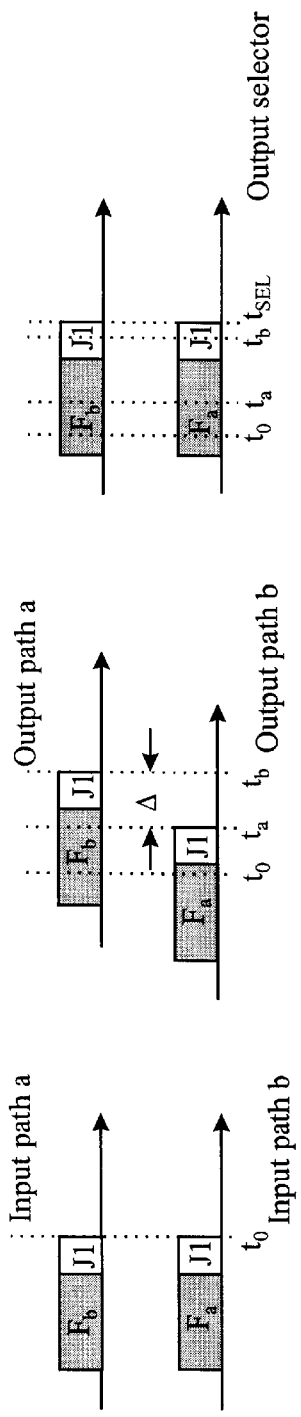
FIGS. 2A, 2B and 2C show the principle of hitless switching.

The principle of hitless switching is intuitively shown in FIGS. 2A to 2C. FIG. 2A shows frames $F_a$ and $F_b$ that leave node 20' at time $t_0$ travelling towards node 20. Frame $F_a$ travels on short path a, and frame $F_b$ travels on long path b. The frames are identical in content and phase at time $t_0$ when they leave the transmitter of node 20'.

FIG. 2B shows frames $F_a$ and $F_b$ at the receiver of the trib equipment 10, where frame $F_a$ arrives at $t_a$ and $F_b$ arrives at $t_b$. The time difference between $t_a$ and $t_0$ represents the travel time of a frame along the short path, and the time difference between $t_b$ and $t_0$ represents the travel time along the long path.

The time difference between the arrival of the early and late frames $F_a$ and $F_b$ is denoted with $\Delta=t_b-t_a$. Knowing $\Delta$, the early frame may be delayed accordingly, so that $F_a$ and $F_b$ arrive at the selector of the trib equipment at the same time $t_{SEL}$, perfectly aligned as shown in FIG. 2C, to enable switching with no errors.

Figure 3:
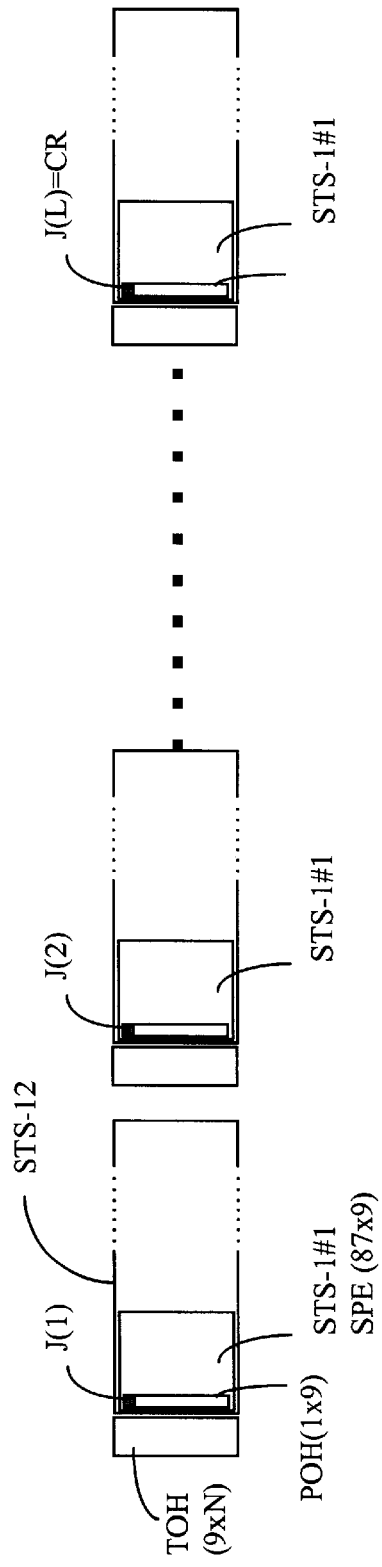
FIG. 3 illustrates how the trace message is inserted into the frames of the information signal.

A distinct trace message is provided on any connection that is configured to be hitless. The size of the trace message is selected in accordance with the rate of the signal, the difference in length between the long and short path, and the number of nodes in the two paths. The last byte of the trace message is used for a carriage return code, that indicates to the receiver the end of the trace message. Firmware can configure this message independently for each connection. FIG. 3 shows the J1 byte of the trace message in (L) successive STS-N frames, where L is 64 for the example disclosed and illustrated in this application. As an STS-1 frame is 125 $\mu$s, the trace message repeats every 8 $\mu$s.

The maximum delay variation between the long and short path is in the example illustrated in this specification is 4.0 $\mu$s and it was determined taking into account the above parameters and the size of the memory buffer used for alignment, as it will be shown shortly. As indicated above, this figure is applicable to the example illustrated in this application, but the invention is not limited to it.

Figure 4:
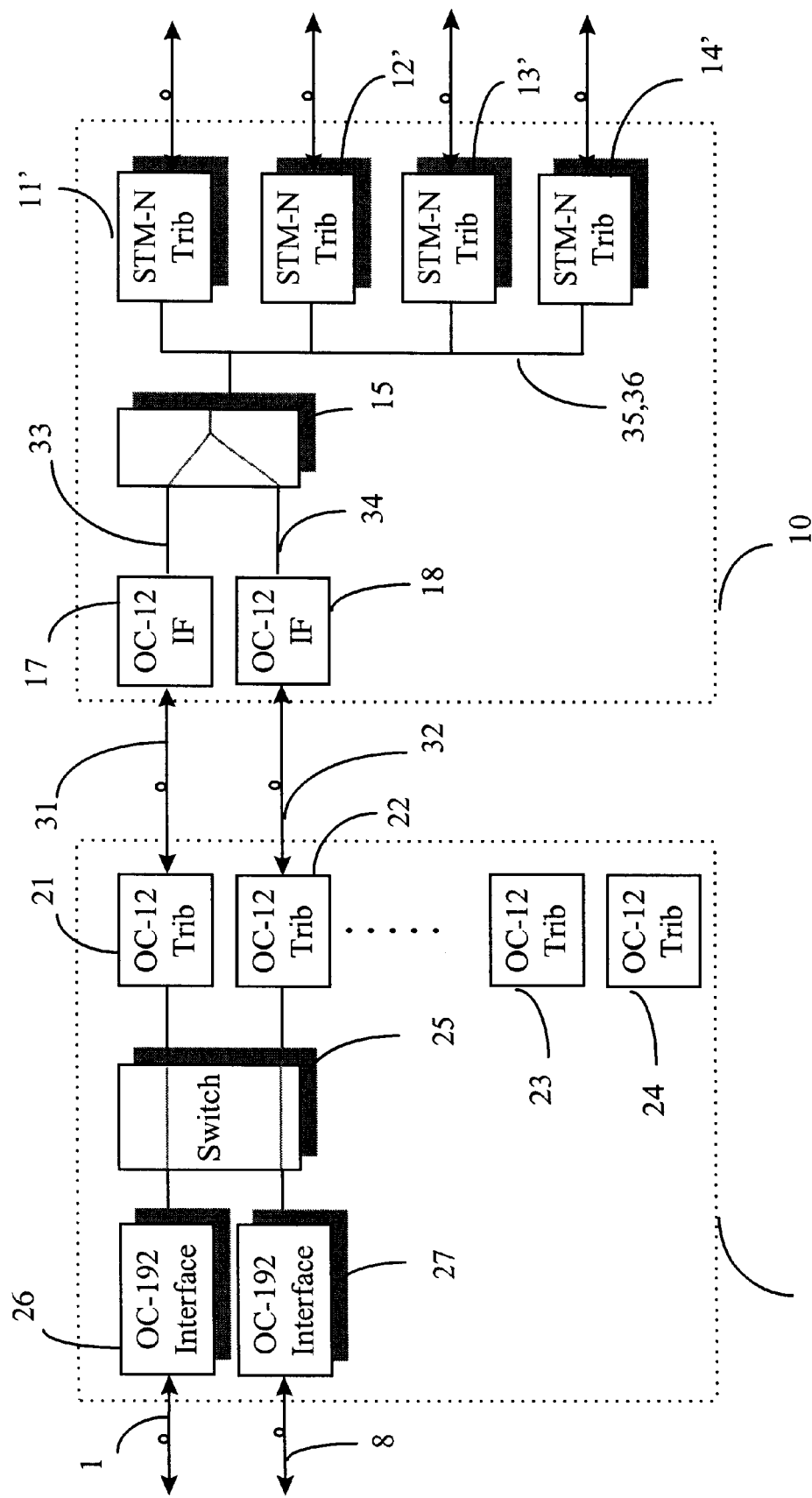
FIG. 4 is an enlarged view of a path terminating equipment (PTE) and a tributary terminal of the example of FIG. 1.

FIG. 4 shows node 20 of virtual ring 1 and the tributary equipment 10 provided with the hitless switching capabilities according to the invention. The overlapping shaded boxes 26 and 27 refer to 1+1 protected circuit packs which interface the OC-192 ring with a switch 25 at NE 20.

According to the direction of the traffic, the OC-192 interfaces 26 and 27 are responsible with receiving/ transmitting the optical carrier OC-192, effecting optical-to-electrical (O/E) or electrical-to-optical (E/O) conversion, de/scrambling, stripping/adding the STS-192 line and section overhead to the payload, and transmitting/receiving the STS-SPE and the TOH to/from switch 25.

In the East direction, switch 25 routes the STS-12 tributaries from the OC-192 interfaces 26, 27 to a corresponding OC-12 tributary block 21–24 according to their destination. In the West direction, switch 25 routes the STS-12 to the respective OC-192 interface.

Each OC-12 tributary block 21–24 receives/transmits a respective OC-12 from/to switch 25 and further transmits/ receives it to/from the corresponding interface at the tributary equipment 10. Blocks 21–24 also effect the electrical to optical conversion for the STS-12 to OC-12, for the East direction and the optical-to-electrical conversion for the West direction.

FIG. 4 shows the traffic flow for a single OC-12 tributary equipment 10, but up to 16 OC-12 blocks 10 can be connected to the OC-192 node 20. Alternatively, tributary equipment 10 may be designed for other SDH/SONET rates, without affecting the general concept according to the invention.

Tributary equipment 10 comprises OC-12 interfaces 17, 18 which are responsible for exchanging OC-12 traffic with ring node 20 over bidirectional working and protection cables 31 and 32. The hitless switching according to this invention is implemented in these interfaces, and may be enabled or disabled for each tributary equipment 10. A block diagram of the OC-12 interface 17 is shown in FIG. 5 and it will be described shortly.

Block 15 bridges the OC-12 traffic sent around the ring 1 in both directions to the end users at the transmit side. At the receive end, both paths 33 and 34 are monitored for performance and the better one is selected and dropped to the respective STM-N tributary circuit pack 11'–14'.

The STM-N tributary interfaces are also protected using 1+1 Auto Protection Switching (APS), SONET K-bytes, which are exchanged between the protected pair of STM-N circuit packs 11'–14' and the lower rate networks 11–14 shown in FIG. 1. Again, FIG. 4 shows a particular case where the tributaries are at STM-Ns (N=0, 1, or 4) rates, but the invention may be applied to other SDH/SONET rates.

Figure 5:
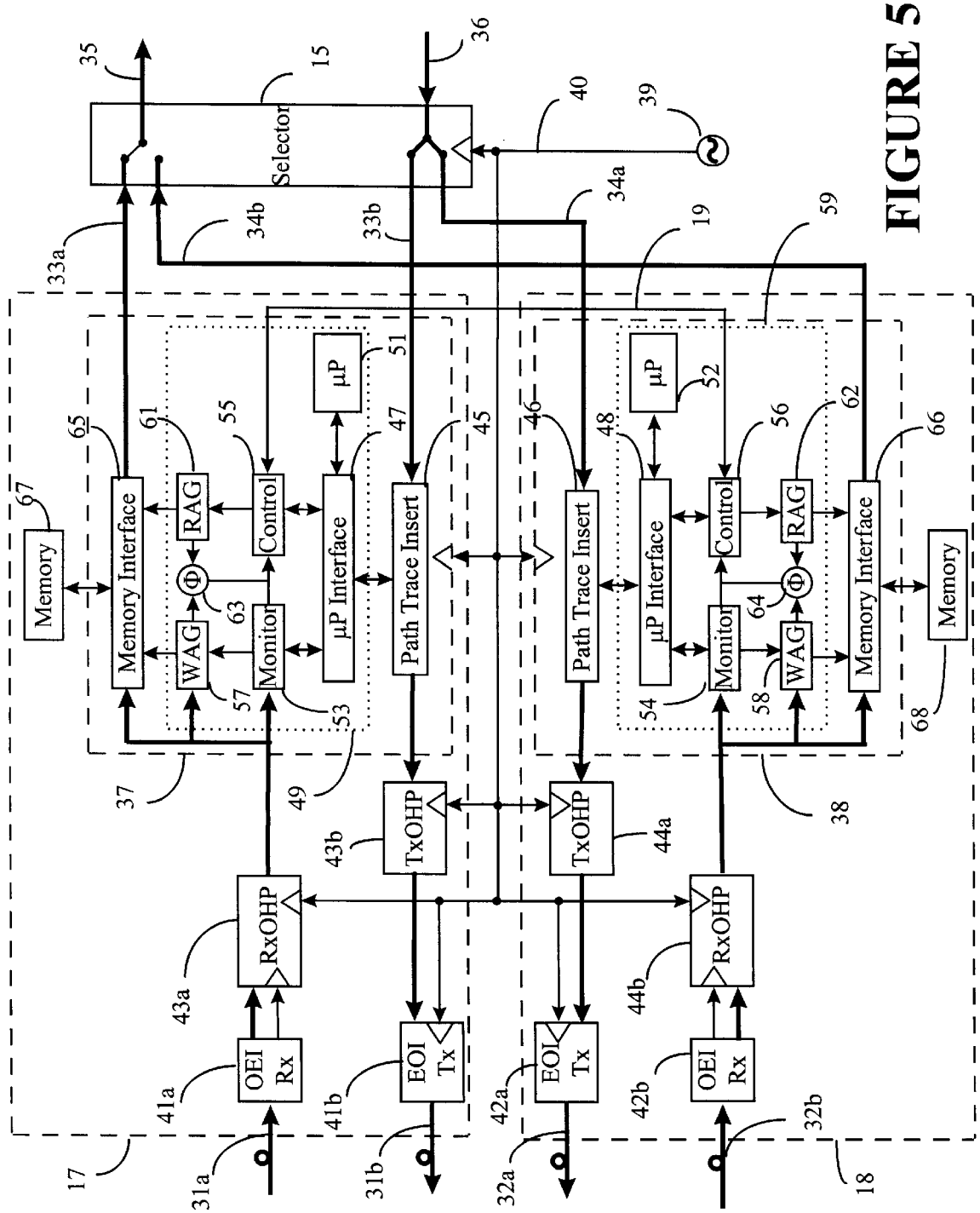
FIG. 5 is a block diagram of the hitless switching implementation.

FIG. 5 shows a partial block diagram of tributary equipment 10, namely the OC-12 interfaces 17 and 18 and block 15.

Each interface 17, 18 comprises a receiver, a transmitter, an align block 37, 38 and a memory 67, 68. Only the pertinent blocks of the receiver and the transmitter are illustrated on FIG. 5 for simplification. Namely, for interface 17, block OEIRx 41a is the optical-to-electrical interface of the receiver for the East direction traffic and EOITx 41b is the electrical-to-optical interface of the transmitter for the West direction traffic. RxOHP 43a illustrates the overhead processor of the receiver, which terminates the line and section overhead for the incoming frames. Block TxOHP 43b is the overhead processor for the transmitter, which inserts the overhead bytes in the TOH of the outgoing frames.

Similarly, interface 18 comprises OEIRx 42b, EOITx 42a, RxOHP 44b, and TxOHP 44a.

Align block 37 of interface 17 comprises a path trace insert block 45, a pointer processor 49 and a memory interface 65. Similarly, align block 38 of interface 18 comprises path trace insert block 46, a pointer processor 59 and a memory interface 66. These blocks are synchronized on line 40, and linked to each-other on a serial link 19, to allow for compensation of the delay between the trace messages received on the short and long paths and alignment of the signals at selector 15.

Memories 67 and 68 are preferably SRAMs, and each comprises 25056 Bytes or 4 µs for each STS-1 connection. This buffer can store 32 STS-1s frames (an STS-1 has 125 µs), i.e. half of the entire trace message, so that bytes J1(1) and J1(33) of the trace message are written in the same address. It is to be noted that the invention is not limited to this size of the buffer.

Generation of the Transmitted Trace Message

For the West direction of transmission, the received OC-12 trib signal arriving at selector 15 on line 36 is provided to both trib interfaces 17 and 18, and specifically to align blocks 37 and 38, on a respective line 33b and 34a. Each align block 37, 38 generates a transmitted path trace message from a trace message pre-stored at align blocks 37, 38.

The pre-stored message comprises 64 octets, each of which is inserted into J1 time-slot of 64 consecutive STS-1 frames, by the respective path trace insert block 45, 46, as shown in FIG. 3. A different trace message is provided for each STS-1 of the STS-12 signal. One octet is used for the CR code that indicates the end of the trace message. The transmitted trace message is inserted in the transmitted information signals on the respective long and short paths. The TOH is then added to the payload in the STS-12 frame by TxOHP 44a and 44b respectively, and EOITx blocks 41b and 42a convert the respective transmitted STS-12 signal into an OC-12 signal, which is transmitted to NE 20', and from there to its destination, along the long path b, on line 31b, and short path a along line 32a.

The transmitted trace message is continuously generated, even prior to and after hitless switching has been accomplished at the destination.

Alignment of the Long and Short Path

For the East direction of transmission, the incoming traffic received on line 31a arrives at interface 17 over the short path a, as seen on FIG. 1. This OC-12 signal is first converted to an electrical STS-12 signal in optical-to-electrical interface/receiver (OEIRx) 41a. Next, the TOH of the short path received signal is terminated (section and line overhead) and processed in the receiver overhead processor (RxOHP) 43a. Block 43a also performs pointer processing to synchronize the received optical signal to the system clock 39. Align block 37 recovers the path trace bytes J1 from path overhead time-slots (POH) of the respective STS-1 frame, and regenerates a path trace message out of 64 consecutive frames. This message is defined herein as the first variant of the received trace message, and is 64 bytes, or 8 µs long.

Similar operations take place in the twin OC-12 interface 18, which receives the long path received optical OC-12 signal over line 32b, and regenerates a second variant of the received trace message using OEIRx 42b, RxOHP 44b and align block 38. After the signal received on long path is synchronized with the system clock 39, it will still have a different phase with the signal arrived on the short path, since they were subjected to different delays on the respective paths. Pointer H1–H2 recovered in blocks 43a and 44b have the information regarding the beginning of the respective payload before alignment.

SRAM interfaces 65, 66 are used to interface to the respective SRAM memories 67, 68. The interfaces 65, 66 along with the SRAM memory 67, 68 implement a 2-port memory capable of storing 4 µs of data. The data is stored in the memory with a parity bit to detect memory failures. The SRAM interface 65, 66 bypasses the SRAM memory 67, 68 completely if the respective OC-12 connection is configured to be normal. In this case, a constant delay will be introduced on the signal passing through the align block 37, 38.

Align blocks 37 and 38 compensate for the delay between the signals arriving on the long and short paths and adjust accordingly the offset between the payload pointer and the first byte of information of the STS-SPE for the STS-12 frames passing through them. For example, for an information signal arriving on short path a, align block 37 determines Δ based on information received from align block 38, modifies accordingly up or down the value of the payload pointers H1, H2, and executes a byte stuffing operation for the respective SPE. The phase difference Δ is then absorbed by the align blocks.

Stuff bytes are added and respectively deleted in the early and late payloads, and the payload pointer H1–H2 of the respective early and late SPEs are adjusted accordingly.

FIGS. 6A and 6B show the delay adjustment for hitless switching. The short and long paths are delayed such that after the delay they are phase aligned. More precisely, as also shown in FIG. 2B, the traffic on the path a is delayed with $t_{SEL}-t_a$, while the signal on path b is delayed by $t_{SEL}-t_b$. Thereafter, the selected path can be switched without causing any bit errors. The optimal delay that is added into the long and short paths is depicted in this figure by the shaded area. The amount of the delay can range from 0 to 4 µs in this example.

Pointer adjustments occurs synchronously with the 2 kHz backplane framing signal. The speed with which the align blocks work to align the two paths trace messages can be slowed in order to spread the pointer adjustments over a longer period of time. This is done by programming the amount of 2 kHz frames it will take to change the buffer fill by a single byte. For entirely synchronous systems, this will be the number of 2 KHz frames between pointer adjustments. The maximum rate of adjustments for the example disclosed and illustrated herein is once every four frames.

The phase alignment function is implemented using linked pointer processors (PP) 49 and 59, which communicate to each other through serial bus 19, being synchronized to each-other on line 40.

As indicated above, an expected value programmed by firmware for each hitless trib connection is pre-stored in a respective monitor block 53 and 54 and the received trace messages are first checked against these expected values, for verifying if there is a continued connection from the transmitter to the intended receiver.

Each PP 49, 59 comprises a monitor unit 53, 54 which compares the received trace message with the expected value and informs a respective control block 55, 56 if the received trace message is different from the expected value.

Monitoring of error bytes B3, path unequipped monitoring (octet C2), and signal label monitoring (octet C2) are also performed by monitor units 53, 54. Each monitor unit 53, 54 performs B3 monitoring for SD (signal degrade) and SF (signal fail), where the threshold levels for SD and SF are configurable. If B3 errors occur on the incoming signal, the path trace being received for the affected frame is not compared to the expected value and hitless switching is disabled.

Each control block 55, 56 is responsible with generating a lock signal (high) when the write address for pointer processor 49 ($W_a$) and write address for pointer processor 59

($W_b$) are 'good', and the difference between them is less than a threshold. Control blocks 55 and 56 set an alarm point indicating that maintenance switching will not be hitless if alignment is not possible, shown by a low lock signal.

As the pointer processors do not know which is the long path and which is the short path, the write addresses are better defined in relative terms. Thus, for pointer processor 49, its own address $W_a$ is also referred to as the internal write address ($W_{int}$) and the address $W_b$ of the pointer processor 59 is also referred to as the external write address ($W_{ext}$). From the point of view of pointer processor 59, its own address $W_b$ is also referred to as the internal write address ($W_{int}$) and the address $W_a$ of the pointer processor 49 is also referred to as the external write address ($W_{ext}$).

The internal write address ($W_{int}$) is declared to be bad if:
1. The expected path trace signal is not being received;
2. LOP, or AIS-P is declared at the WAG block;
3. B3 errors cause the signal degrade threshold to be crossed (configurable);
4. B3 errors cause the EBER threshold to be crossed (configurable);
5. There is a signal label mismatch (C2) (configurable); or
6. Parity errors have been detected on the input data (configurable).

The external write address ($W_{ext}$) is declared bad if:
1. The status from the control block on the mate pointer processor declares that its write address is bad; or
2. There are checksum errors on the serial interface between the two control blocks on the two pointer processors.

The threshold for the difference between the internal and external write addresses is set according to the size of the buffer. For the 4 µs buffer used in the embodiment illustrated in this application, the threshold is 25056 bytes.

The control blocks also ensure that the receiving pointer processors 49 and 59 can identify that they are both receiving the same path and that they are receiving the correct path. .

FIGS. 7A to 7C show the operation of the pointer processors 49, 59. FIG. 7A shows a buffer in a respective memory 67, 68 in the initial stage, when the pointer processors are not synchronized. The first information signal is written in memory 67, the current writing address being denoted with $W_a$, while the second information signal is written in memory 68, the current writing address being denoted with $W_b$. The write address of each WAG 57, 58 is incremented by 1 every time a byte of the incoming signal is written into memories 67, 68. The WAG 57, 58 are implemented as a mod 2M counter. Therefore, values of the write addresses range from 0 to 2M−1.

The memories 67 and 68 are synchronized by always writing the first byte of the received trace signal in memory location zero of the respective buffer. Each write address generator (WAG) 57, 58 calculates the write address value and monitors for the carriage return in the path trace message. The carriage return (one per 64 byte message) allows the monitor to reset the write address to 0.

At pointer processor 49, the control block 55 sends out the value of the internal write and read addresses $W_a$ and $R_a$ to the mate pointer processor 59 once per STS-1 frame. Control block 56 of pointer processor 59 also sends out the value of the write and read addresses $W_b$ and $R_b$ to the mate pointer processor 49, and these values are also represented on FIG. 7A. This communication is performed on the serial link 19.

WAGs 57, 58 also monitor for LOP-P (loss of pointer) and AIS-P (alarm indication signal-path). If the write address is not currently in phase with the received path trace message, an exact match with the carriage return is required to reset the write address. Also, the reset operation is disabled if there are B3 errors on the incoming frame. A reset on the write address will cause a hit on the traffic signal received. Whenever this reset happens, an alarm is generated.

At the beginning of the align operation, both pointer processors 49, 59 determine whether they should perform a stuffing operation, using EQ(2)', as it will be described shortly. Using both write addresses $W_a$ and $W_b$, stuffing is performed at the first pointer processor 49 to bring the internal read address $R_a$ into a deterministic value R. The read address is incremented by 1 every time a byte is read out of memory. It is also implemented as a mod 2M counter having valid values ranging from 0 to 2M−1.

A similar operation is performed simultaneously at the pointer processor 59, which uses write addresses $W_a$ and $W_b$, and performs stuffing to bring the internal read address $R_b$ into value R. Since both pointer processors use the same information to determine if a stuff should occur, the read addresses of both pointer processors will eventually become equal, after a settling time.

This is illustrated in FIGS. 7B and 7C, where FIG. 7B show the operation of the pointer processors 49 and 59 after synchronization, for a small delay Δ, while FIG. 7C show the operation for a large delay Δ.

Both positive and negative stuffs can be performed by the RAG block. When RAG 61 performs a positive stuffing, RAG 62 performs a negative stuffing. During a positive stuff, one less byte is read out of memory during an STS-1 frame, and during a negative stuff, one extra byte is read out of memory during an STS-1 frame.

If alignment is not achieved over a predetermined period of time, an alarm will be generated and hitless switching will be disabled. For the embodiment described and illustrated in this specification, alignment is checked by comparing the read addresses. However, the external read address is not used to determine stuffing.

Alignment is achieved in one of the cases illustrated in FIGS. 7B and 7C, when angles a and b are equal and $R_a = R_b = R$. This means:

$$M + R - W_a = W_b - R \quad\quad\quad EQ(1)$$

were M is the buffer size (25056 Bytes or 4.0 msec), R is the read address, $W_a$ is the write address for the short path, and $W_b$ is the write address for the long path.

As the buffer size is accounted for, for any value of $W_a$ and $W_b$, there is only one value of read address that will not cause a stuffing operation. In this way, the read addresses R on each pointer processor will converge to the same value.

From this formula the stuffing can be controlled by the following.

$$0 \le (W_b + W_a) - 2R - M \le 1 \quad \text{No stuff} \quad\quad EQ(2)$$

$$(W_b + W_a) - 2R - M > 1 \quad \text{Negative stuff} \quad\quad EQ(3)$$

$$(W_b + W_a) - 2R - M < 0 \quad \text{Positive stuff} \quad\quad EQ(4)$$

The pointer processors do not have to know which is the long path and which is the short path in order to perform the correct stuffing operation. EQ(2)–EQ(4) can therefore be rewritten as:

$$0 \le (W_{ext} + W_{int}) - 2R_{int} - M \le 1 \quad \text{No stuff} \qquad \text{EQ(2)}'$$

$$(W_{ext} + W_{int}) - 2R_{int} - M > 1 \quad \text{Negative stuff} \qquad \text{EQ(3)}'$$

$$(W_{ext} + W_{int}) - 2R_{int} - M < 0 \quad \text{Positive stuff} \qquad \text{EQ(4)}'$$

where $W_{ext}$ is the write address of the external (mate) pointer processor, $W_{int}$ is the write address of the internal pointer processor, and $2R_{int}$ is the read address of the internal pointer processor. It is to be noted again that the external read address $R_{ext}$ is not used in calculations.

Figure 8:
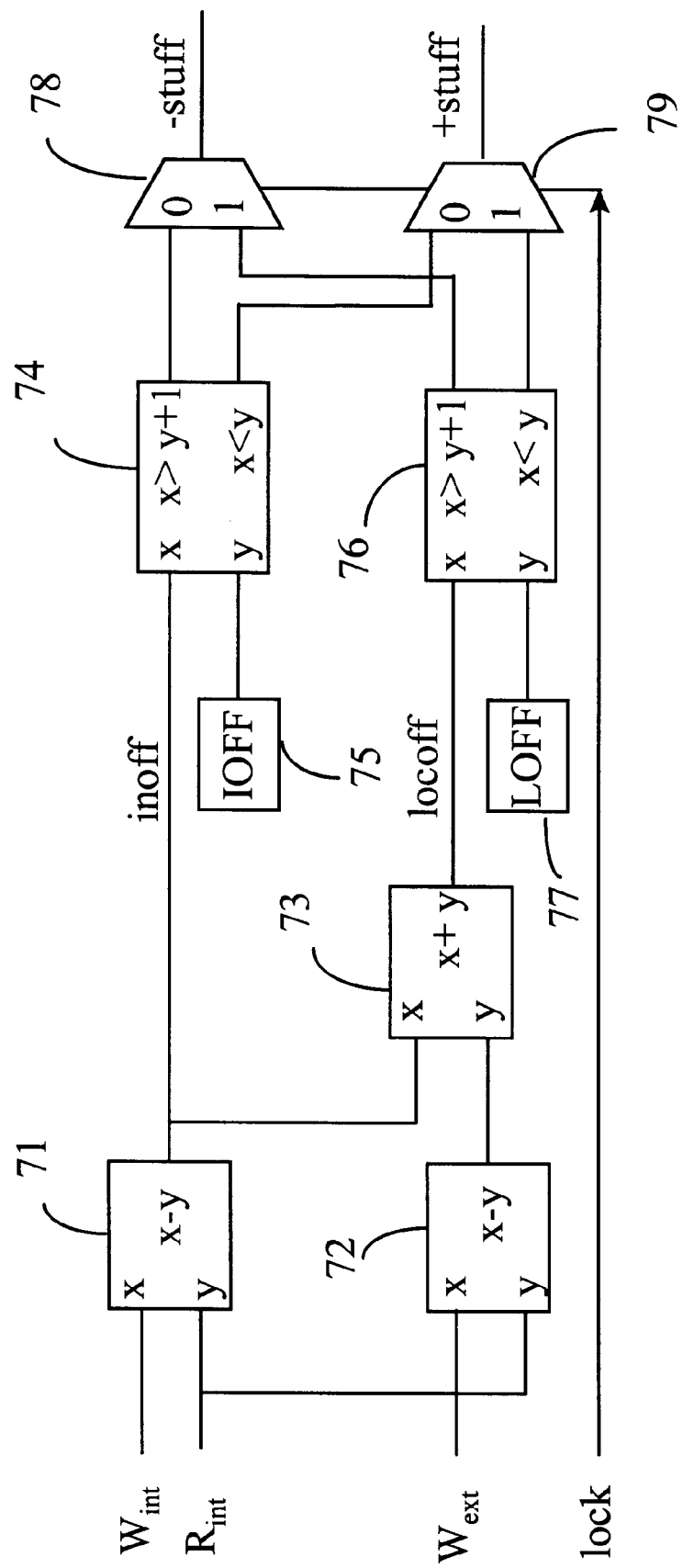
FIG. 8 illustrates the block diagram of the phase comparator of FIG. 5.

A detailed view of the phase comparator design, implementing the above equations is shown in FIG. 8. The design is complicated somewhat by the need to do the calculations in mod 2M arithmetic.

On power up the IOFF register 75 is set to ½M. If the state of the lock signal from the control block 55 goes from high to low, the IOFF register 75 is set to the current 'intoff' value. This ensures that no excessive pointer adjustments will occur.

If the state of the lock signal from the control block 55 goes from low to high, the LOFF register 77 is set to the current 'locoff' value. The value of LOFF register 77 will then be incremented or decremented as required until it has the value of 'M'. The incrementing or decrementing will be done every n×2 kHz frames where 'n' is programmable. This allows the pointer processors to align more slowly so as to not cause excessive pointer adjustments. For example, to obtain a maximum pointer adjustment rate consistent with a 1 ppm frequency offset of the incoming SPE, the value of 'n' would be set to approximately 320.

The maximum allowable stuff rate allowed in SONET is once per 4 frames (one per 8 kHz). It is necessary for both pointer processors to stuff during the same frame to ensure hitless maintenance switching. This is done, as indicated above, by synchronizing the RAG stuffing opportunities to the 2 kHz system frame signal.

If the WAG block detects LOP or AIS-P, the RAG block generates AIS-P. The RAG block can also be configured to send out AIS-P by firmware.

What is claimed is:

1. A hitless path switching method for re-establishing synchronous traffic along a primary path from an alternate path, comprising the steps of:
   at an originating path terminal,
      generating a trace message, inserting said trace message in an information signal and transmitting said information signal along said primary path as a first information signal and along said alternate path as a second information signal;
   at a receiving path terminal,
      recovering a first variant of said trace message from said first information signal and recovering a second variant of said trace message from said second information signal, each said first and second variants being a respective delayed variant of said trace message;
      aligning said first and said second information signals based on the phase difference between said first and said second variants using linked pointer processors and generating a lock signal when alignment is completed; and
   at said originating path terminal,
      discontinuing transmission of said information signal along said alternate path upon generation of said lock signal.

2. A method as claimed in claim 1, wherein said step of generating comprises;
   configuring said trace message to have a fixed length (L) and a content uniquely characterizing said information signal, said originating path terminal, and said receiving path terminal;
   providing a succession of said trace messages in said information signal by inserting a byte (I) of said trace message in a predetermined time-slot of a frame of said information signal; and
   providing a specific byte in each trace message for detecting the beginning of said trace message in said information signal, where (I) is the range of a byte of said trace message I ∈.

3. A method as claimed in claim 2, wherein said step of recovering said first variant comprises:
   storing at said receiving terminal an expected trace message, identical with said trace message;
   storing the bytes of said first information signal at consecutive addresses in said first buffer;
   comparing said first variant stored in said first buffer with said expected trace message;
   discontinuing hitless switching operation whenever said first variant is different from said expected trace message.

4. A method as claimed in claim 3, wherein said step of recovering said second trace message comprises:
   storing at said receiving terminal an expected trace message, identical with said trace message;
   storing the bytes of said second information signal at consecutive addresses in said second buffer;
   comparing said second variant stored in said second buffer with said expected trace message;
   discontinuing hitless switching operation whenever said second trace message is different from said expected trace message.

5. A method as claimed in claim 4, wherein said step of aligning comprises:
   for each byte (I) of said trace message, determining a difference $\Delta$ between a write address of said byte (I) of said first variant in said first buffer and a write address of said byte (I) of said second variant in said second buffer;
   for every (k) frame, phase aligning the payload in said (k) frame of said first information signal with the payload in said (k) frame of said second information signal according to said difference; and
   repeating the above steps until said first and second information signals are aligned.

6. A method as claimed in claim 5, wherein said step of determining comprises calculating $\Delta = (W_{ext} + W_{int}) - 2R_{int} - M$, where $W_{ext}$ is the writing address in said second buffer, $W_{int}$ is the writing address in said first buffer, R is a read address in said first buffer, and M is the size of said first and said second buffers.

7. A method as claimed in claim 6, wherein said step of phase aligning is performed until $0 \le \Delta \le 1$.

8. A method as claimed in claim 6, wherein said step of aligning comprises, whenever $\Delta > 1$:
   at said first align block, effecting a negative stuffing for displacing the payload in the frame of said first information signal to start earlier; and
   at said second align block, effecting a positive stuffing for displacing the payload in the frame of said second information signal to start later.

9. A method as claimed in claim 6, wherein said step of aligning comprises, whenever Δ<0:
   at said first align block, effecting a positive stuffing for displacing the payload in the frame of said first information signal to start later; and
   at said second align block, effecting a negative stuffing for displacing the payload in the frame of said second information signal to start earlier.

10. A hitless path switching apparatus for re-establishing synchronous traffic along a primary path from an alternate path, comprising:
   a first align block comprising a first pointer processor for receiving an information signal over a primary path and providing a first outgoing information signal of a controlled phase difference with said information signal;
   a link for providing to said first pointer processor, time information from a second pointer processor; and
   a first buffer for storing a first variant of a received trace message extracted from a known timeslot of L successive frames of said information signal.

11. An apparatus as claimed in claim 10, further comprising a path trace insert block for inserting a transmitted trace signal in a transmitted information signal, said trace signal being configured to have a fixed length and a content uniquely characterizing said information signal, said originating path terminal, and said receiving path terminal.

12. An apparatus as claimed in claim 10, wherein said second pointer processor receives said information signal over an alternate path, and provides a second outgoing information signal having said phase difference with said information signal.

13. An apparatus as claimed in claim 12, further comprising a second buffer for storing a second variant of said received trace message extracted from a known timeslot of L successive frames of said information signal received over said alternate path.

14. An apparatus as claimed in claim 10, wherein said first pointer processor comprises:
   a first write address generator for calculating an internal write address ($W_{int}$) and storing a byte (m) of said first information signal address into said first buffer, at said internal write address;
   a first read address generator for reading a byte (n) of said first information signal from an internal read address ($R_{int}$) in said first buffer;
   a control block for communicating said internal write address ($W_{int}$) to said second pointer processor over said link, receiving an external write addresses ($W_{ext}$) from said second align block over said link, determining if alignment is possible, and generating a lock signal if alignment is possible; and
   a phase comparator for calculating the difference between said $W_{ext}$ and said $W_{ext}$ and driving said read address generator to perform one of a positive and a negative stuffing for said first outgoing signal, by changing said internal read address $R_{int}$ based on said $W_{int}$ and said $W_{ext}$.

15. An apparatus as claimed in claim 14, wherein said first pointer processor further comprises a monitor block for comparing said first variant with an expected value corresponding to said first information signal, and informing said control block if said first variant is different from said expected value for aborting alignment.

16. An apparatus as claimed in claim 14, wherein said monitor resets said first write address generator on receipt of a specific byte in said first variant.

17. An apparatus as claimed in claim 14, wherein said control block generates an alarm signal when difference between said $W_{int}$ and said $W_{ext}$ is greater than a threshold.

* * * * *